United States Patent [19]

Jeffers

[11] 4,318,136
[45] Mar. 2, 1982

[54] MAGNETIC RECORDING APPARATUS AND METHOD

[75] Inventor: Frederick J. Jeffers, Escondido, Calif.

[73] Assignee: Spin Physics, Inc., San Diego, Calif.

[21] Appl. No.: 121,197

[22] Filed: Feb. 13, 1980

[51] Int. Cl.³ .......................... G11B 5/86; G11B 5/47
[52] U.S. Cl. ......................................... 360/17; 360/66
[58] Field of Search ................ 360/66, 17, 129, 122, 360/29

[56] References Cited

U.S. PATENT DOCUMENTS

| | | | |
|---|---|---|---|
| 2,795,651 | 6/1957 | Camiens | 360/17 |
| 3,641,280 | 2/1972 | Browder | 360/17 |
| 3,760,123 | 9/1973 | Smaller | 360/17 |
| 3,829,896 | 8/1974 | Brock | 360/66 |
| 4,090,662 | 5/1978 | Fayling | 360/2 |
| 4,245,261 | 1/1981 | Shilling et al. | 360/17 |

Primary Examiner—Vincent P. Canney
Attorney, Agent, or Firm—Robert F. Cody

[57] ABSTRACT

By recording an alternating signal in an ancillary recording medium having high coercivity, such medium will exhibit an external field of a given strength. The ancillary medium is placed in proximation to the record zone of a signal-carrying magnetic head cooperative with a primary magnetic recording medium of lesser coercivity, the fields of the head and ancillary medium algebraically adding to effect signal recording in the primary medium. When the field of the ancillary medium has a strength approximating the coercivity of the primary medium, the signal current applied to the magnetic head may be quite small.

7 Claims, 9 Drawing Figures

WHERE H = FIELD AT POINT P
B = REMANENT FLUX OF MEDIUM

MAGNETIC RECORDING APPARATUS AND METHOD

BACKGROUND OF THE INVENTION

1. Field of the Invention

This invention relates in general to magnetic recording, and in particular to apparatus and methods for reducing the level of record current necessary to effect recording in a magnetic medium.

2. Description Relative to the Prior Art

Various techniques have been suggested and/or adopted in the prior art to effect a reduction in the level of record head current necessary to effect recording in a magnetic medium. Among such techniques are (1) the use of cross-field recording, whereby a high frequency bias field is pumped into a magnetic medium by use of a separate bias-producing head in contact with the support, or back, side of a record medium, and (2) the use of a permanent magnet, proximate a record head, to provide DC bias for recording, as is practiced in a number of inexpensive tape recorders.

With the trend toward higher and higher track densities, record current levels in multitrack heads are a matter of major concern. Record currents which are too high, aside from causing the generation of excessive heat, have a tendency to cause inductive coupling between the discrete cores of multitrack heads, thereby undesirably creating core-to-core crosstalk. Cross-field recording alleviates these problems a bit by splitting the total current between two heads, one carrying the information signal and the other carrying the bias signal; but still the total current employed is high. The use of a permanent magnet, on the other hand, while lessening the total current required for recording (all things being equal), undesirably means DC biasing and may cause the pole tips of the signal-carrying record head to become magnetized.

In R. L. Wallace's definitive treatise appearing in *Bell Systems Technical Journal*, October 1951, page 1162, the field strength H at a distance Z from a recording medium of thickness δ, which has been recorded along and in a direction X, with a signal of wavelength λ is defined as:

$$H \simeq -2\pi I_m e^{\frac{-2\pi Z}{\lambda}} \left[ e^{\frac{\pi d}{\lambda}} - e^{\frac{-\pi d}{\lambda}} \right].$$

Since $B = 4\pi I_m$, where B is the flux density in gauss, $$H \simeq \frac{-B}{2} e^{\frac{-2\pi Z}{\lambda}} \left[ e^{\frac{\pi d}{\lambda}} - e^{\frac{-\pi d}{\lambda}} \right];$$

and since, by definition, $$\left[ e^{\frac{\pi \delta}{\lambda}} - e^{\frac{-\pi \delta}{\lambda}} \right] = 2 \sinh \frac{\pi \delta}{\lambda}, \text{ then} \quad (1)$$

$$H \simeq -Be^{\frac{-2\pi Z}{\lambda}} \left[ \sinh \frac{\pi \delta}{\lambda} \right].$$

Interpreting Equation (1), it will appear that, whereas a DC recording (λ = ∞) in a magnetic recording medium will have zero field outside the recording medium, an AC recording in such medium will be productive of a field above the recording surface which is wavelength-dependent.

There are currently available in the marketplace a number of recording media having high coercivity and high remanence. Although such media, pursuant to the below-described invention, are not employed for the recording of information signals therein, they are nonetheless employed as ancillary media to effect recording of information signals in primary media of lesser coercivity. In parts of this specification, 3M Metafine tape, available from the 3M Company, Minneapolis, Minnesota, is discussed as representative of a class of ancillary media useful in practicing the invention. The coercivity of 3M Metafine tape is 1130 oersteds (oe) and its saturation flux is 3600 gauss. Although 3M Metafine tape is specifically identified, any such medium which has a higher coercivity than a primary medium adapted to record information signals will suffice in the practice of the invention. In other words, relative coercivities, and not specific values of coercivities, are what are of concern.

SUMMARY OF THE INVENTION

With the above as background, the concept of the invention is to pre-record an AC signal of a given wavelength (or range of wavelengths) in a high coercivity/high saturation remanence ancillary medium. Then, to effect recording of information signals in a primary medium, the pre-recorded ancillary medium is brought proximate the primary medium while the signal to be recorded in the primary medium is applied to a magnetic head cooperative with the primary medium. Selection of the wavelength (or range of wavelengths) of the signal that is pre-recorded in the ancillary medium depends upon the remanence of the ancillary medium, as well as upon the coercivity of the primary medium and upon the displacement between the ancillary and primary recording media.

Several implementations of the invention are discussed below. Briefly, however, one implementation involves magnegraphics and concerns the use of the ancillary medium, for purposes of DC biasing, in the formation of pictorial information on a magnetic surface. Another implementation concerns the analog recording of a band of information signals in a primary medium, the ancillary medium serving to provide DC biasing, doing so, however, in such a way that magnetization of the record head pole tips is avoided. And still another implementation involves the use of the invention in conjunction with a magnetic head adapted to provide, inherently, AC bias to any signal which it, itself, is adapted to record.

The invention will now be described with reference to the Figures, wherein.

Figure 1:
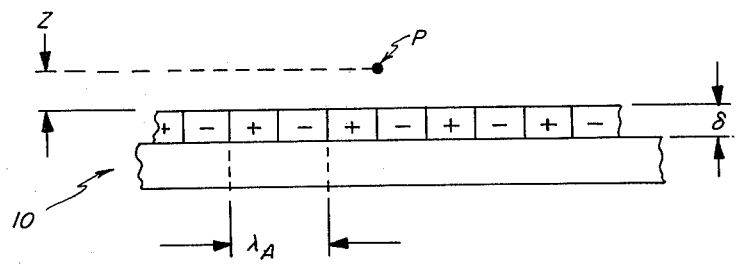
FIG. 1 is a diagram useful in describing the invention.

Reference should now be had to FIG. 1 which graphically depicts the correlation of terms found in Equation (1): An ancillary medium 10 is pre-recorded with a signal of wavelength $\lambda_A$. The field H at point P above the medium 10 depends upon the thickness $\delta$ of the magnetic coating of the medium 10, as well as upon the recorded flux density B and the wavelength $\lambda_A$ of the recorded signal, as discussed above. (Throughout this specification, the designation "$\lambda$" with appropriate subscripts is, for sake of convenience, used interchangeably as a signal and as a signal of a given wavelength.)

Figure 2:
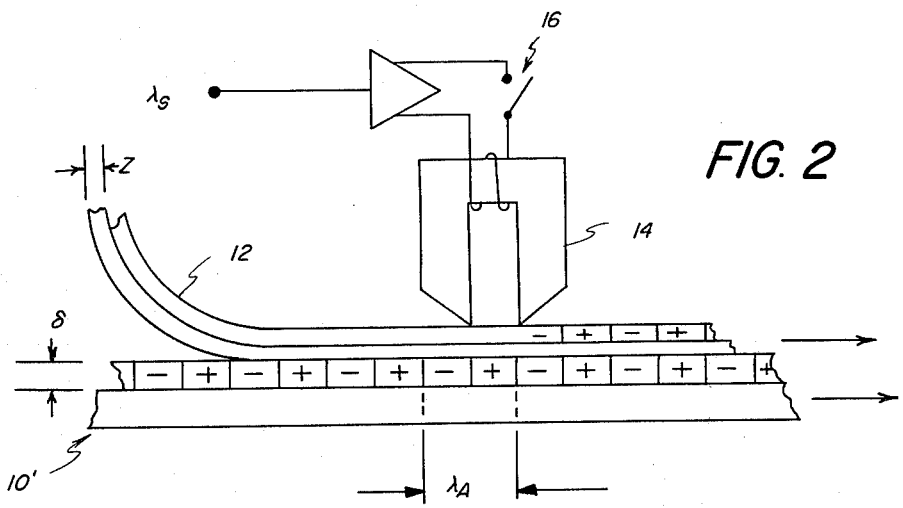
FIG. 2 is a schematic useful in describing a magnegraphic implementation of the invention.
Figure 3:
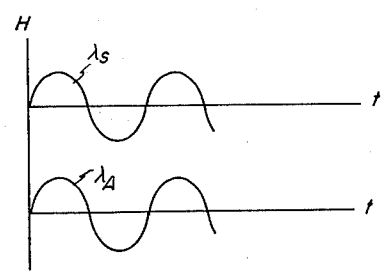
FIG. 3 shows diagrams useful in explaining the embodiment of FIG. 2.

With FIG. 1 and Equation (1) in mind, therefore, next consider the FIG. 2 showing of an ancillary pre-recorded (web) medium 10' in contact with, and moving with (as shown by arrows), a primary recording (web) medium 12 past a record head 14. The pre-recording of the ancillary medium is, in this embodiment, a saturation recording which is effected by means of and with a signal of uniform wavelength $\lambda_A$; and the ancillary medium 10' is of a coercivity greater than the coercivity of the medium 12. Information signals $\lambda_S$ are selectively applied to the record head 14 by actuation of a switch 16, the signals $\lambda_S$ being of the same wavelength as the pre-recorded signal $\lambda_A$; and the signals $\lambda_S$ and $\lambda_A$ are kept in sync, as will be discussed below. See FIG. 3. The strength of the information signals $\lambda_S$ (i.e., the current corresponding to the information signals) is such that the head fringe field is less than the coercivity of the primary recording medium 12, and thus alone cannot effect recording in the medium 12. Pursuant to Equation (1) above, the "in sync" bias field provided by the ancillary medium occurs in the vicinity of the record zone of the head 14, whereby the bias and information signal fields algebraically add to a level in excess of the coercivity of the medium 12 to effect recording of the information signals $\lambda_S$ in the primary medium 12 ... such recording being effected with relatively little record current.

Figure 4:
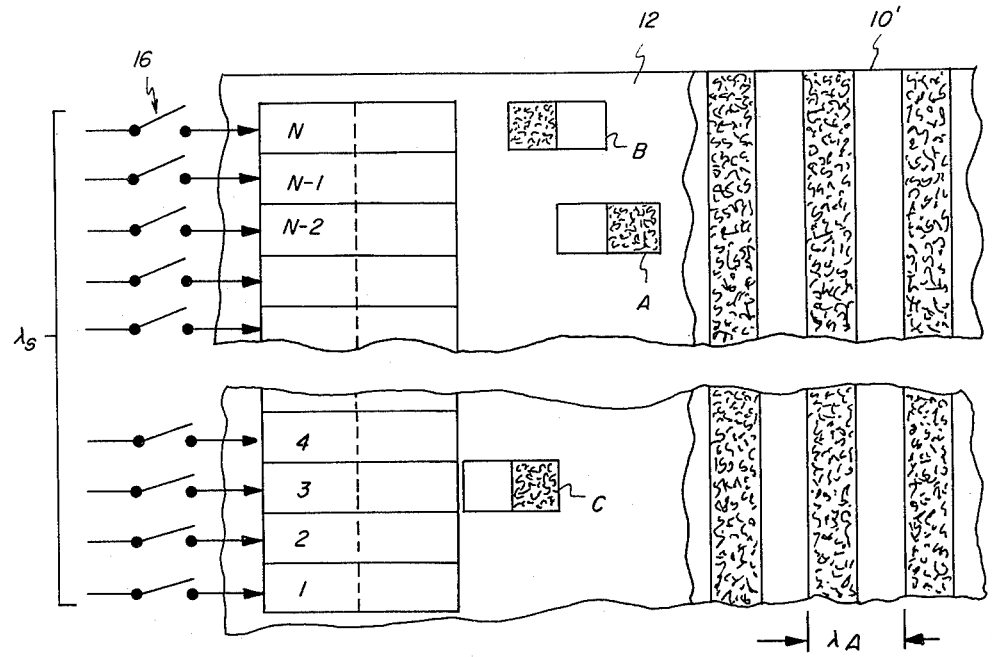
FIG. 4 is a plan view illustrating a magnegraphic implementation of the invention.

A recording practice as discussed immediately above is useful in connection with various magnegraphic applications, whereby a pattern of tonable "magnetic spots" may be applied to a recording medium, the toner in question being transferable as pictorial information from such medium to a receiver sheet, as is known in the art. In such a magnegraphic application, the head 14 of FIG. 2 constitutes a multitrack head; and each core of the head is selectively adapted to carry a respective signal current. See FIG. 4 in which the recording head 14 is depicted as comprising a plurality of record cores 1→N; and the pre-recorded medium 10' (in the form of an endless loop) and the primary medium 12 are webs of, say, 8 inches in width. Selective, successive, closing of switches 16 cooperative with cores N−2, N−1 and 3 causes 3 tonable magnetic "spots" A, B, C to be recorded as pictorial information in the medium 12. (Although each "spot" is depicted as being only $\lambda_A$ in length, for sake of easy visualization, it will be apparent that the size of the "spots" will depend on respective core widths, and on the time that the individual switches 16 are closed.)

Figure 4A:
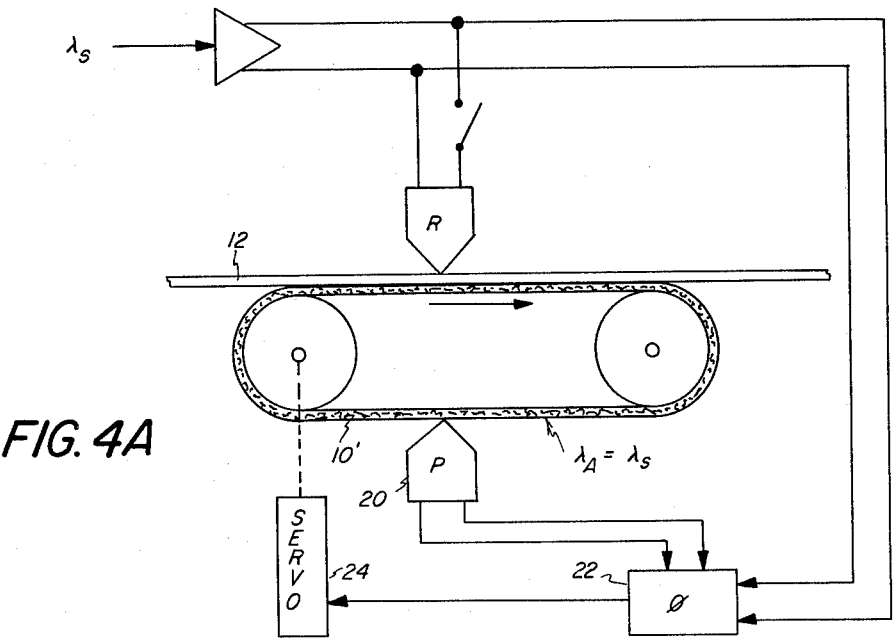
FIG. 4a is a schematic diagram illustrating apparatus for effecting sync between pre-recorded signals in an ancillary medium and signals corresponding to magnegraphic information.

The showing of FIG. 4a is presented to show how sync may be maintained between the signals $\lambda_A$ and $\lambda_S$, albeit that a variety of other techniques may be employed for such purposes, as well. Referring, therefore, to FIG. 4a, a playback head 20 cooperates with the looped ancillary medium 10' to play back the pre-recorded signals $\lambda_A$. Such signals $\lambda_A$ are applied to a phase detector 22 adapted to receive the information signals $\lambda_S$. Any phase error signal appearing at the output of the phase detector 22 is applied to a servo 24 for driving the web 10' to maintain sync.

Figure 5:
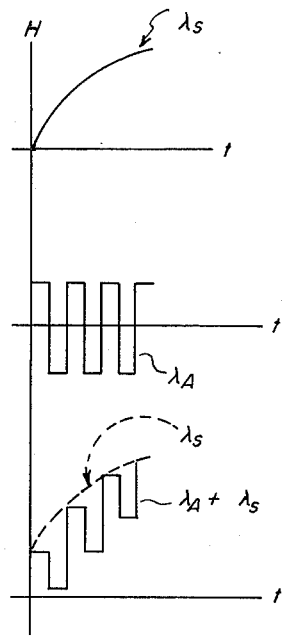
FIG. 5 is a diagram useful in explaining another embodiment of the invention.

As indicated earlier, the apparatus of FIG. 2 may be employed to effect "non-magnegraphic" analog recording of a band of information signals ... the shortest wavelength in the band of information signals being, say, $\lambda_S$. To effect such recording, the ancillary medium 10' is provided with a pre-recorded signal $\lambda_A$ having a wavelength which is shorter than the wavelength $\lambda_S$ (say, one-fifth as long) ... and, of course, sync is not maintained (indeed, cannot be maintained) between the pre-recorded and information signals. See FIG. 5 which shows that the pre-recorded signal $\lambda_A$ acts as DC bias for, for example, the information signals $\lambda_S$, whereby a train of pulses $(\lambda_A + \lambda_S)$ is recorded as a carrier for the information signals $\lambda_S$. Although the signal $\lambda_A$ serves to provide DC bias for the information signals $\lambda_S$, it will be appreciated that the alternating character of the signal $\lambda_A$ vis-a-vis the head 14 precludes unwanted magnetization of the poles of the head 14. And, although the field associated with the resultant signal $(\lambda_A + \lambda_S)$ will be affected by the prior magnetic history of the particles which form the coating on the medium 12, variations in such magnetic history will constitute, in most applications, noise which may easily be filtered away.

Figure 6:
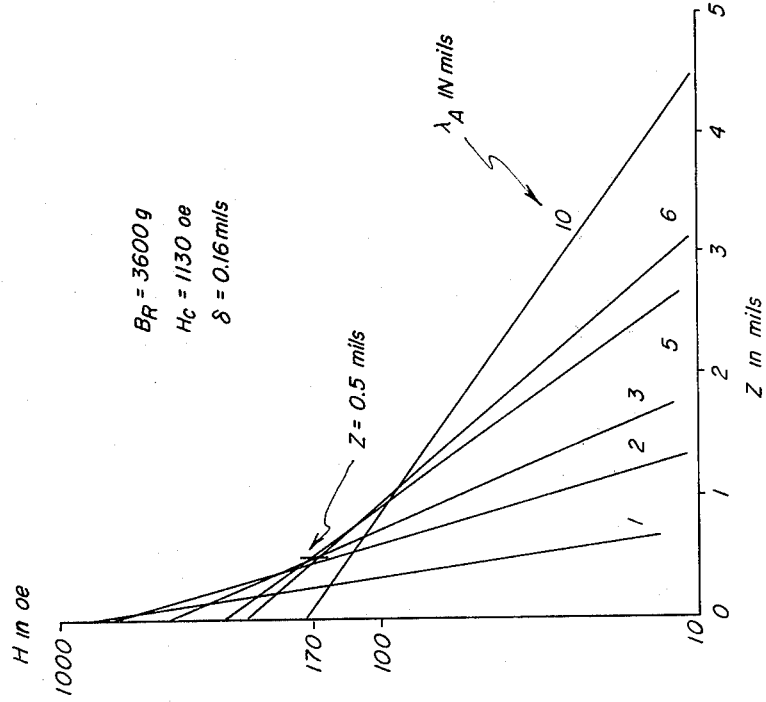
FIG. 6 depicts a set of curves corresponding to Equation (1) above.

FIG. 6 depicts a family of curves corresponding to the calculated (Equation 1) field strength H as a function of distance Z from the surface of the "saturation recorded" ancillary medium 10' ... the respective curves in the family of curves being each corresponding to a particular recorded wavelength $\lambda_A$. And, as noted above, the medium 10' is, in the presently preferred practice of the invention, comprised of a medium having high coercivity/high saturation remanence such as 3M Metafine tape which, as is known, has a coercivity of 1130 oe and, when saturation recorded, has a remanence flux density of 3600 gauss. Given that the magnetic coating of the primary medium 12 has, say, a typical state-of-the-art coercivity of 250 oe, and given that the support for such coating has a thicknesss of $Z=0.5$ mils, a recorded wavelength of $\lambda_A=3$ mils in the ancillary medium 10' will cause a field of about 170 oe at the magnetic coating on the primary medium 12. Thus, to effect recording in the primary medium 12, the current-induced fringe field of the head need only provide a bit more than 250 oe−170 oe=80 oe, such "bit more" being dependent upon the level of flux to be recorded in the primary medium 12.

Figure 7:
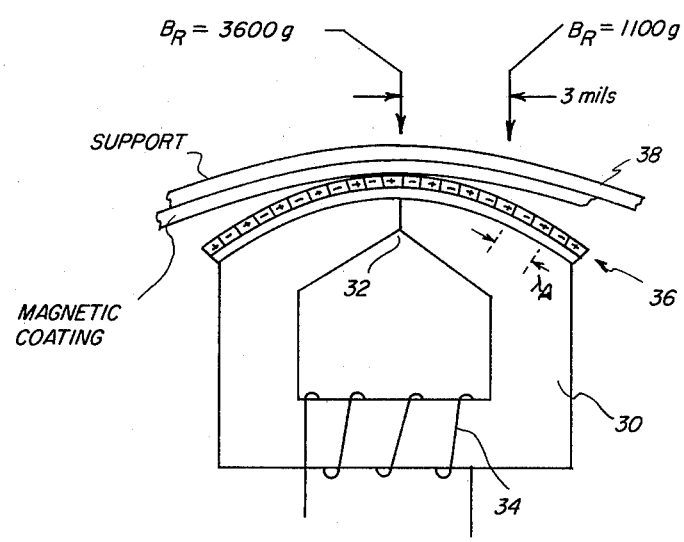
FIG. 7 is a side view of a record head embracing the invention.

Given the above teachings, next consider the FIG. 7 adaptation of the invention: A magnetic head core 30 having a transducer gap 32 supports a coil 34 adapted to carry signal current for creating a fringe field at the gap 32. A strip of Metafine, or similar, tape 36 is bonded to the face of the head core, such Metafine tape being pre-recorded with a signal of wavelength $\lambda_A$; and such signal, as recorded, falls off from a saturation level (3600 gauss) at the gap to a lesser level, say, a bit below 1100 gauss, at a distance of about 5 times $\lambda_A$ away from the gap ... the wavelength $\lambda_A$ being selected to be, say, about 5 times shorter than any information signal to be recorded by the head core. Thus, assuming the wavelength of the signal $\lambda_4$ is 0.6 mils, then the "fall off" distance is 3 mils, as shown. As magnetic tape 38 having a coercivity of, say, 250 oe, passes the "Metafine-coated" head, the field of the Metafine tape algebraically adds to the field produced by the signal in the coil 34, thereby to effect AC bias recording in the tape 38.

Figure 8:
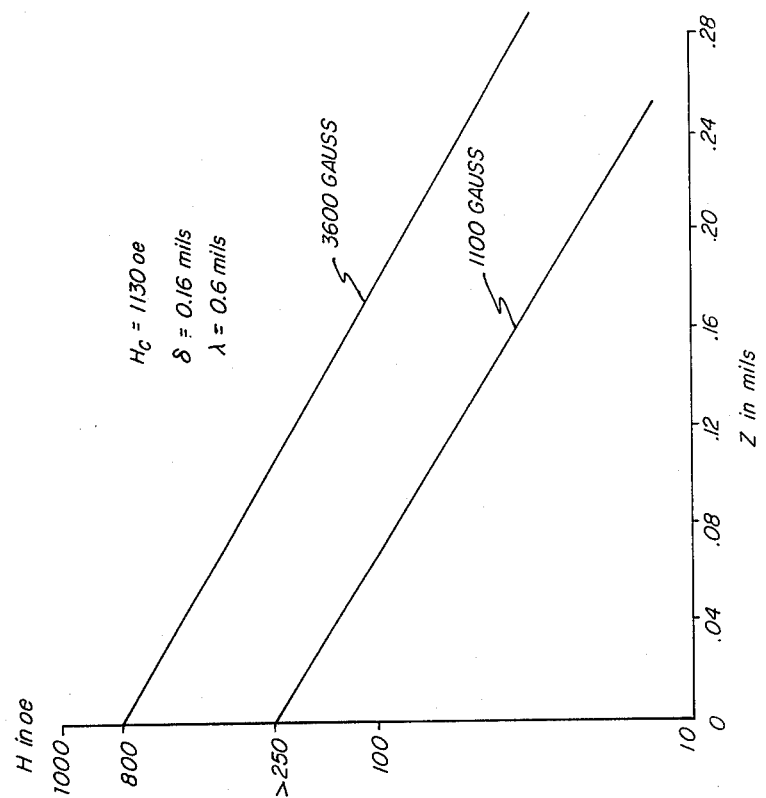
FIG. 8 depicts another set of curves corresponding to Equation (1) above.

Reference should now be had to the curves of FIG. 8 which graphically depict the workings of the head core of FIG. 7: At the gap 32 of the head core, the Metafine tape, saturated with 3600 gauss, produces a field of about 800 oe which algebraically adds to the field produced by the (small) signal current in the coil 34. As the flux density associated with the Metafine tape falls to below 1100 gauss, the field contributed by the Metafine tape falls to below 250 oe, the coercivity of the recording tape 38. Thus, as far as the recording tape 38 is concerned, it sees signal flux, produced by the signal current in the coil 34, riding atop an AC bias field of decreasing strength ... which is exactly the kind of field produced in conventional AC bias recording. (Although not specifically noted above, it may be convenient to envision the invention, in each of its respective applications, as a transfer of the bias function, common to magnetic recorders, from a real time operation to one which occurs prior to the actual recording operation itself. Thus, a high level of magnetic energy is instilled in an ancillary support prior to a recording operation, and employed during, and to effect, that operation, with low record current.)

The invention has been described in detail with particular reference to preferred embodiments thereof, but it will be understood that variations and modifications can be effected within the spirit and scope of the invention.

What is claimed is:

1. Apparatus for recording information signals in a primary magnetic recording medium having a given coercivity, said apparatus comprising:
   (a) a gapped magnetic head adapted to record said information signals in said primary magnetic recording medium;
   (b) means for providing relative motion between said primary magnetic recording medium and said head, whereby flux fringing the gap of said head coacts with said primary magnetic recording medium at different points thereof; and
   (c) an ancillary magnetic recording medium having pre-recorded therein an alternating signal, said ancillary recording medium having a greater coercivity than said given coercivity and being so disposed with respect to the primary medium that flux from the ancillary medium applies a magnetic field to said primary medium in proximation to the gap of said gapped magnetic head, whereby the information signal flux and the flux from the ancillary medium algebraically add to effect recording of said information signals in said primary recording medium,
   said apparatus being adapted for recording information signals of a predetermined wavelength in said primary medium,
   (a) said pre-recorded signal of said ancillary medium having the same predetermined wavelength as the information signals; and
   (b) said apparatus including means for so providing relative motion between said ancillary medium and said magnetic head that signal flux from said ancillary medium is in sync with the information signal flux at the gap of said head.

2. The apparatus of claim 1 wherein:
   (a) said magnetic head is a multitrack magnetic head;
   (b) said ancillary medium is a web pre-recorded widthwise thereof over a plurality of tracks which correspond to the tracks of said multitrack magnetic head; and
   (c) said apparatus includes means for selectively actuating respective cores of said head which are coextensive with said widthwise pre-recording, thereby to record magnetic spots in widthwise locations of said primary magnetic recording medium.

3. The apparatus of claim 1, adapted for recording within said primary recording medium, information signals which fall within a range of signals of differing wavelengths, wherein:
   (a) the pre-recorded signal of said ancillary medium has a wavelength which is a fraction of the wavelength of the signal having the shortest wavelength within said range of signals; and
   (b) said apparatus includes means for providing relative motion of a predetermined speed between said ancillary medium and said magnetic head.

4. The apparatus of claim 1 wherein:
   (a) said ancillary magnetic recording medium is so fixedly disposed with respect to said head that the field applied by said ancillary medium to said primary medium diminishes with distance from the gap of said head, the signal recorded in the ancillary medium being, in proximation to said gap, of a wavelength which is a fraction of the shortest wavelength to be recorded by said apparatus.

5. Apparatus for magnetically recording information signals in a primary magnetic recording medium comprising:
   (a) a pre-recorded ancillary medium having a coercivity greater than the coercivity of said primary medium, said ancillary medium being pre-recorded with an alternating signal, whereby said ancillary medium has magnetic flux emanating therefrom; and
   (b) transducer means for applying flux corresponding to said information signals to said primary medium, said transducer means and said ancillary medium being so disposed with respect to each other and with respect to said primary medium that flux emanating from said ancillary medium algebraically adds to the flux applied to said primary medium by said transducer means, thereby to lessen the level of flux, applied by said transducer means, which is necessary to effect recording of said information signals in said primary medium,
   said information signals being of a predetermined wavelength;
   said pre-recorded alternating signal being also of that same predetermined wavelength; and
   said apparatus including means for providing such relative motion between said ancillary medium and said transducer means that said pre-recorded and information signals are in sync.

6. The apparatus of claim 5 wherein said transducer means is a gapped magnetic head, and wherein said apparatus includes means for selectively applying said information signals to said head.

7. The apparatus of claim 5 adapted to record a band of alternating signals, wherein:

(a) said transducer means is a gapped magnetic head;
(b) said pre-recorded ancillary medium is fixedly disposed with respect to said head;
(c) said pre-recorded alternating signal has a wavelength less than the shortest wavelength within said band of signals to be recorded; and
(d) said head and pre-recorded ancillary medium are so disposed with respect to each other that flux emanating from said ancillary medium diminishingly adds to the flux applied by said head to said primary medium as a function of distance from the record zone of said head.

* * * * *